United States Patent
Choi et al.

(10) Patent No.: US 12,212,001 B2
(45) Date of Patent: Jan. 28, 2025

(54) NEGATIVE ACTIVE MATERIAL FOR RECHARGEABLE LITHIUM BATTERY AND RECHARGEABLE LITHIUM BATTERY INCLUDING SAME

(71) Applicant: SAMSUNG SDI CO., LTD., Yongin-si (KR)

(72) Inventors: Ilyoung Choi, Yongin-si (KR); Soonbong Choi, Yongin-si (KR); Joongho Moon, Yongin-si (KR); Hee Seon Choi, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 96 days.

(21) Appl. No.: 17/966,984

(22) Filed: Oct. 17, 2022

(65) Prior Publication Data

US 2023/0299288 A1    Sep. 21, 2023

(30) Foreign Application Priority Data

Mar. 16, 2022  (KR) .................. 10-2022-0032885

(51) Int. Cl.
| | |
|---|---|
| *H01M 4/583* | (2010.01) |
| *H01M 4/38* | (2006.01) |
| *H01M 10/052* | (2010.01) |
| *H01M 10/44* | (2006.01) |
| *H01M 4/02* | (2006.01) |

(52) U.S. Cl.
CPC .......... *H01M 4/583* (2013.01); *H01M 4/386* (2013.01); *H01M 10/052* (2013.01); *H01M 10/44* (2013.01); *H01M 2004/021* (2013.01); *H01M 2004/027* (2013.01)

(58) Field of Classification Search
CPC .... H01M 4/583; H01M 4/386; H01M 10/052; H01M 10/44; H01M 2004/021; H01M 2004/027
USPC ...................................... 429/218.1
See application file for complete search history.

(56) References Cited

U.S. PATENT DOCUMENTS

| | | | | |
|---|---|---|---|---|
| 2007/0154807 | A1* | 7/2007 | Kalynushkin | .......... H01M 4/13 427/427 |
| 2013/0181172 | A1* | 7/2013 | Nishi | .................... H01M 4/134 252/502 |
| 2016/0043408 | A1* | 2/2016 | Kwon | ................ C01B 21/0828 429/405 |
| 2019/0229325 | A1 | 7/2019 | Ahn et al. | |
| 2020/0212438 | A1 | 7/2020 | Lee et al. | |
| 2020/0411844 | A1 | 12/2020 | Oh et al. | |
| 2021/0408600 | A1* | 12/2021 | Cui | .................. H01M 10/4235 |

(Continued)

FOREIGN PATENT DOCUMENTS

| | | |
|---|---|---|
| JP | 6599106 B2 | 10/2019 |
| KR | 10-1796819 B1 | 11/2017 |

(Continued)

OTHER PUBLICATIONS

Korean Office action dated Feb. 21, 2024.

*Primary Examiner* — James M Erwin
(74) *Attorney, Agent, or Firm* — Lee IP Law, P.C.

(57) ABSTRACT

A negative active material for a rechargeable lithium battery and a rechargeable lithium battery including the same, the negative active material including a rod-shaped crystalline carbon; and a silicon-carbon composite.

13 Claims, 10 Drawing Sheets

(56) References Cited

U.S. PATENT DOCUMENTS

2022/0069421 A1* 3/2022 Dalton ................ H01M 50/474
2023/0307607 A1 9/2023 Ahn et al.

FOREIGN PATENT DOCUMENTS

| KR | 10-2019-0028266 A | 3/2019 | |
|----|-------------------|--------|--|
| KR | 10-2018854 B1 | 9/2019 | |
| KR | 10-2019-0122417 A | 10/2019 | |
| KR | 10-2019-0122953 A | 10/2019 | |
| KR | 2019116818 A * | 10/2019 | ............. B82Y 30/00 |
| KR | 2019122417 A * | 10/2019 | ........ H01M 10/0525 |
| KR | 10-2021-0000983 A | 1/2021 | |
| KR | 10-2021-0028054 A | 3/2021 | |
| KR | 10-2021-0037657 A | 4/2021 | |
| KR | 2021037657 A * | 4/2021 | ........ H01M 10/0525 |

* cited by examiner

100

NEGATIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2022-0032885 filed in the Korean Intellectual Property Office on Mar. 16, 2022, the entire contents of which are incorporated herein by reference.

BACKGROUND

1. Field

Embodiments relate to a negative active material for a rechargeable lithium battery and a rechargeable lithium battery including the same.

2. Description of the Related Art

Recently, the rapid supplement of electronic devices such as mobile phones, laptop computers, and electric vehicles, using batteries require surprising increases in demand for rechargeable batteries with relatively high capacity and lighter weight. Particularly, a rechargeable lithium battery has recently drawn attention as a driving power source for portable devices, as it has a lighter weight and high energy density. Accordingly, improving performances of rechargeable lithium batteries has been considered.

A rechargeable lithium battery includes a positive electrode and a negative electrode which include active materials being capable of intercalating and deintercalating lithium ions, and an electrolyte, and generates electrical energy due to the oxidation and reduction reaction when lithium ions are intercalated and deintercalated into the positive electrode and the negative electrode.

The above information disclosed in this Background section is only for enhancement of understanding of the background of the invention, and therefore it may contain information that does not form the prior art that is already known in this country to a person of ordinary skill in the art.

SUMMARY

The embodiments may be realized by providing a negative active material for a rechargeable lithium battery, the negative active material including a rod-shaped crystalline carbon; and a silicon-carbon composite.

The rod-shaped crystalline carbon may have a length of about 60 μm to about 80 μm.

The rod-shaped crystalline carbon may have an aspect ratio of about 4 to about 20.

The rod-shaped crystalline carbon may be artificial graphite.

A mixing ratio of the rod-shaped crystalline carbon and the silicon-carbon composite may be a weight ratio of about 0.1:100 to about 3:100.

The negative active material may further include spherical crystalline carbon.

The spherical crystalline carbon may be natural graphite, artificial graphite, or a combination thereof.

An amount of the spherical crystalline carbon may be about 99 parts by weight to about 40 parts by weight, based on 100 parts by weight of the negative active material.

The silicon-carbon composite may include silicon particles and amorphous carbon.

The silicon-carbon composite may include silicon particles, crystalline carbon, and amorphous carbon.

The embodiments may be realized by providing a rechargeable lithium battery including a negative electrode including the negative active material according to an embodiment; a positive electrode; and an electrolyte.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
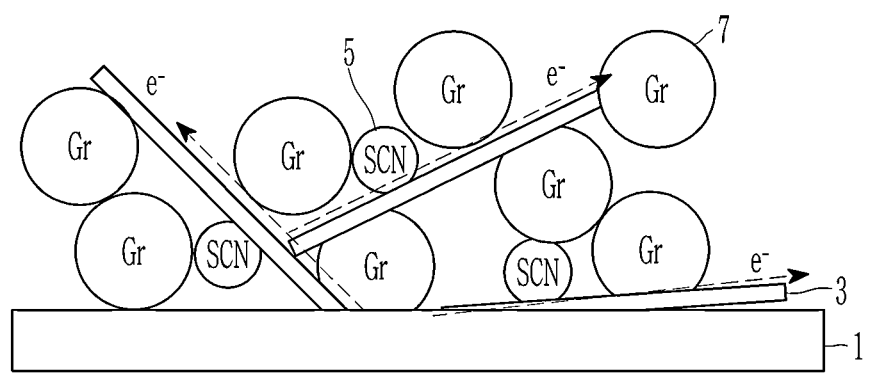
FIG. 1 is a schematic view showing a negative electrode according to one embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout. As used herein, the term "or" is not an exclusive term, e.g., "A or B" would include A, B, or A and B.

In the specification, when a definition is not otherwise provided, an average particle diameter indicates an average particle diameter (D50) where a cumulative volume is about 50 volume % in a particle distribution. The average particle size (D50) may be measured by a method well known to those skilled in the art, for example, by a particle size analyzer, or by a transmission electron microscopic image or a scanning electron microscopic image. Alternatively, a dynamic light-scattering measurement device is used to perform a data analysis, and the number of particles is counted for each particle size range. From this, the average particle diameter (D50) value may be obtained through a calculation.

A negative active material for a rechargeable lithium battery may include, e.g., a rod-type or rod-shaped crystalline carbon and a silicon-carbon composite.

In case of including the rod-shaped crystalline carbon with a long axis and a short axis as the negative active material, as shown in FIG. 1, the rod-shaped crystalline carbon 3 may act as a supporter and may act as a passage for transferring lithium ions from the current collector 1 to the silicon-carbon composite 5 or graphite 7. In an implementation, the rod-shaped crystalline carbon may help improve the contact between the active materials. In an implementation, the resistance may be reduced, and the volume expansion of the composite (which could otherwise occur due to charging and discharging) may be effectively absorbed in the negative active material layer, and thereby preventing shortcomings due to the volume expansion. SCN 5 indicates the silicon-carbon composite, Gr 7 indicates graphite in FIG. 1 which shows the negative active material including the rod-shaped crystalline carbon and silicon-carbon composite, and further including graphite.

Figure 2:
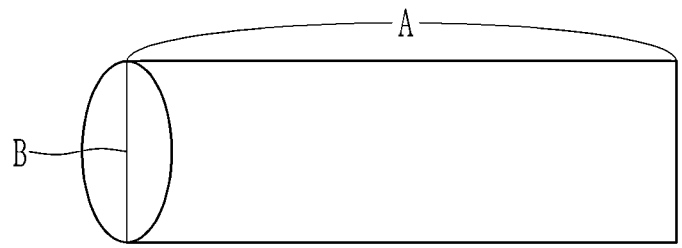
FIG. 2 is a schematic view showing a rod-shaped crystalline carbon according to one embodiment.

The effects by including the rod-shaped crystalline carbon may be effectively obtained by using the rod-shaped crystalline carbon having a long diameter (e.g., dimension or length of a major axis) of, e.g., about 60 µm to about 80 µm. In an implementation, the rod-shaped crystalline carbon may have a long diameter of, e.g., about 62 µm to about 80 µm, about 65 µm to about 80 µm, about 67 µm to about 80 µm, or about 70 µm to about 80 µm. The long diameter means a length, e.g., a size or length of a long axis (A) among the long axis (A) and a short axis (B) of the rod (stick) crystalline carbon shown in FIG. 2. In an implementation, the long diameter may indicate an average long diameter.

When the rod-shaped crystalline carbon includes the long diameter within the ranges, it may facilitate contact between the current collector and the active material, thereby further improving conductivity, without stressing during the negative electrode preparation (coating and pressing).

In an implementation, the rod-shaped crystalline carbon may have an aspect ratio of, e.g., about 4 to about 20, or about 5 to about 20, about 6 to about 20, about 8 to about 20, or about 10 to about 20. In an implementation, the aspect ratio may be a maximum aspect ratio.

When the aspect ratio of the rod-shaped crystalline carbon is within the ranges, the conductivity may be further improved by readily contacting between the current collector and the active material.

In an implementation, the rod-shaped crystalline carbon may be of a stick-type or stick-shape substantially filled inside (e.g., solid) and having a long axis and a short axis, and does not indicate a tubular or a fibrous type having a hollow such as carbon nanotubes. The tubular crystalline carbon or the fibrous crystalline carbon having the aspect ratio and the long diameter may not provide the effect of using the rod-shaped crystalline carbon and may cause fading of capacity and efficiency.

In an implementation, a mixing ratio of the rod crystalline carbon and the silicon-carbon composite may be a weight ratio of, e.g., about 0.1:100 to about 3:100, about 0.2:100 to about 2:100, or about 0.5:100 to about 1:100. Maintaining the mixing ratio of the rod crystalline carbon and the silicon-carbon composite within the ranges may help ensure that the resistance may be effectively reduced, thereby further improving the high-rate characteristics and further preventing the fading of the cycle-life characteristics due to the volume expansion.

The silicon-carbon composite may include silicon particles and amorphous carbon, e.g., may include an agglomerated product in which at least one silicon particle is agglomerated and having an amorphous carbon covered thereon. The amorphous carbon may be positioned between the silicon particles.

The silicon-carbon composite according to one embodiment may include silicon particles, amorphous carbon, and crystalline carbon, e.g., an agglomerated product in which at least one silicon particle and crystalline carbons are agglomerated, and having an amorphous carbon covered thereon. The amorphous carbon may be positioned between the silicon particles.

The amorphous carbon may be soft carbon, hard carbon, mesophase pitch carbide, sintered cokes, or a combination thereof. The crystalline carbon may be natural graphite, artificial graphite, or a combination thereof.

In an implementation, in the silicon-carbon composite, an amount of the silicon particles may be about 1 wt % to about 60 wt %, based on the total weight (e.g., 100 wt %) of the silicon-carbon composite, or may be about 3 wt % to about 60 wt %.

When the silicon-carbon composite includes silicon particles and amorphous carbon, an amount of amorphous carbon may be a residual amount, excluding silicon particles.

Furthermore, if the silicon-carbon composite includes silicon particles, crystalline carbon, and amorphous carbon, an amount of the silicon particles may be the same as described above, an amount of the amorphous carbon may be about 20 wt % to about 60 wt % based on the total weight of the silicon-carbon composite, and an amount of the crystalline carbon may be about 20 wt % to about 60 wt % based on the total weight of the silicon-carbon composite.

The silicon particles may have a particle diameter of about 10 nm to about 30 µm, e.g., about 10 nm to about 1,000 nm, or about 20 nm to about 150 nm. Maintaining the average particle diameter of the silicon particles within the ranges may help ensure that the side reaction of the negative active material and an electrolyte may be further inhibited.

When the amorphous carbon is positioned by covering it on the surface of the agglomerated product, i.e., the secondary particles, the thickness may be suitably controlled, e.g., to about 5 nm to about 100 nm.

The negative active material according to one embodiment may further include spherical crystalline carbon. When the negative active material further includes spherical crystalline carbon, rolling properties during a pressing procedure of the negative electrode preparation may be improved, and thus, the high capacity negative electrode may be prepared.

When the negative active material further includes spherical crystalline carbon, an amount of the spherical shape crystalline carbon may be about 99 parts by weight to about 40 parts by weight, based on 100 parts by weight of the negative active material.

The spherical crystalline carbon may be natural graphite, artificial graphite, or a combination thereof.

In an implementation, an average particle diameter (D50) of the spherical shape crystalline carbon may be about 10 μm to about 20 μm, or about 12 μm to about 18 μm. The spherical crystalline carbon having the average particle diameter (D50) of the above ranges may help further improve the point-contact between the negative active materials and the density of the negative electrode.

An embodiment provides a rechargeable lithium battery including a negative electrode including the negative active material, a positive electrode, and an electrolyte.

The negative electrode may include a current collector and a negative active material layer formed on at least one surface of the current collector.

The negative active material may be the negative active material according to one embodiment, and may include the negative active material according to one embodiment as a first active material and crystalline carbon as a second active material. The crystalline carbon may be artificial graphite, natural graphite, or a combination thereof.

An amount of the negative active material may be about 95 wt % to about 99 wt %, based on the total weight of the negative active material layer. The amount of the negative active material may be an amount of the active material according to one embodiment, or may be a total amount of a mixture of the active material and the crystalline carbon when the active material is used together with the crystalline carbon.

In an implementation, the negative active material layer may include a binder, and may further include a conductive material. An amount of the binder may be about 1 wt % to about 5 wt %, based on the total weight of the negative active material layer. An amount of the conductive material may be about 1 wt % to about 5 wt %, based on the total weight of the negative active material layer.

The binder may help improve binding properties of negative active material particles with one another and with a current collector. The binder may include a non-aqueous binder, an aqueous binder, or a combination thereof.

The non-aqueous binder may include an ethylene propylene copolymer, polyacrylonitrile, polystyrene, polyvinylchloride, carboxylated polyvinylchloride, polyvinylfluoride, polyurethane, polytetrafluoroethylene, polyvinylidene fluoride, polyethylene, polypropylene, polyamide imide, polyimide, or a combination thereof.

The aqueous binder may include a styrene-butadiene rubber, an acrylated styrene-butadiene rubber (ABR), an acrylonitrile-butadiene rubber, an acrylic rubber, a butyl rubber, a fluorine rubber, an ethylene oxide-containing polymer, polyvinyl pyrrolidone, polyepichlorohydrin, polyphosphazene, an ethylene propylene diene copolymer, polyvinylpyridine, chlorosulfonated polyethylene, latex, polyester resin, an acrylic resin, a phenolic resin, an epoxy resin, polyvinyl alcohol, or a combination thereof.

When the aqueous binder is used as a negative electrode binder, a cellulose compound may be further included to provide viscosity as a thickener. The cellulose compound may include, e.g., carboxymethyl cellulose, hydroxypropyl methylcellulose, methyl cellulose, or alkali metal salts thereof. The alkali metal may be Na, K, or Li. The thickener may be included in an amount of about 0.1 parts by weight to about 3 parts by weight, based on 100 parts by weight of the negative active material.

The conductive material may be included to provide electrode conductivity, and a suitable electrically conductive material that does not cause a chemical change may be used. Examples of the conductive material may include a carbon material such as natural graphite, artificial graphite, carbon black, acetylene black, ketjen black, a carbon fiber, and the like; a metal material of a metal powder or a metal fiber including copper, nickel, aluminum, silver, and the like; a conductive polymer such as a polyphenylene derivative; or a mixture thereof.

In an implementation, the current collector may include a copper foil, a nickel foil, a stainless steel foil, a titanium foil, a nickel foam, a copper foam, a polymer substrate coated with a conductive metal, or a combination thereof.

Another embodiment provides a negative electrode, a positive electrode, and an electrolyte.

The positive electrode may include a current collector and a positive active material layer on the current collector.

The positive electrode active material may include lithiated intercalation compounds that reversibly intercalate and deintercalate lithium ions. In an implementation, one or more composite oxides of a metal selected from cobalt, manganese, nickel, and a combination thereof, and lithium may be used. In an implementation, the compounds represented by one of the following chemical formulae may be used. 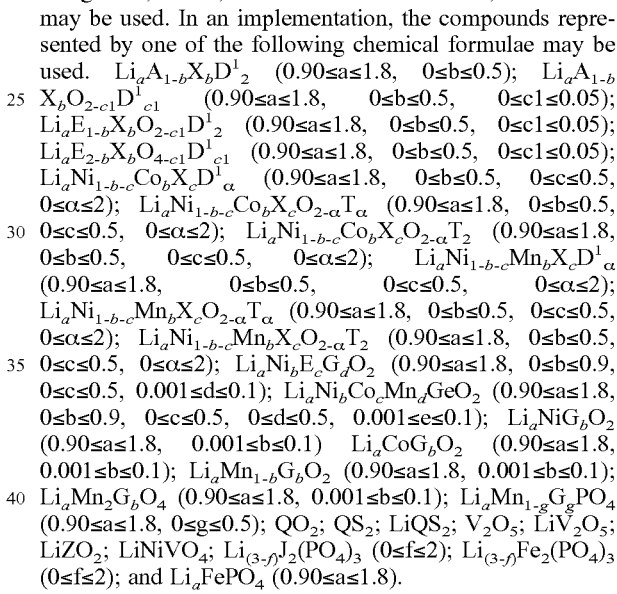 $Li_aA_{1-b}X_bD^1{}_2$ ($0.90 \le a \le 1.8$, $0 \le b \le 0.5$); $Li_aA_{1-b}X_bO_{2-c1}D^1{}_{c1}$ ($0.90 \le a \le 1.8$, $0 \le b \le 0.5$, $0 \le c1 \le 0.05$); $Li_aE_{1-b}X_bO_{2-c1}D^1{}_2$ ($0.90 \le a \le 1.8$, $0 \le b \le 0.5$, $0 \le c1 \le 0.05$); $Li_aE_{2-b}X_bO_{4-c1}D^1{}_{c1}$ ($0.90 \le a \le 1.8$, $0 \le b \le 0.5$, $0 \le c1 \le 0.05$); $Li_aNi_{1-b-c}Co_bX_cD^1{}_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_2$ ($0.90 \le a \le 1.8$, $0 \le b \le 0.5$, $0 \le c \le 0.5$, $0 \le \alpha \le 2$); $Li_aNi_{1-b-c}Mn_bX_cD^1{}_\alpha$ ($0.90 \le a \le 1.8$, $0 \le b \le 0.5$, $0 \le c \le 0.5$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.5$, $0 \le \alpha \le 2$); $Li_aNi_{1-b-c}Mn_bX_cO_{2-\alpha}T_2$ ($0.90 \le a \le 1.8$, $0 \le b \le 0.5$, $0 \le c \le 0.5$, $0 \le \alpha \le 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dGeO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$) $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $Li_aFePO_4$ ($0.90 \le a \le 1.8$).

In the above chemical formulae, A may be selected from Ni, Co, Mn, and a combination thereof; X may be selected from Al, Ni, Co, Mn, Cr, Fe, Mg, Sr, V, a rare earth element, and a combination thereof; D may be selected from O, F, S, P, and a combination thereof; E may be selected from Co, Mn, and a combination thereof; T may be selected from F, S, P, and a combination thereof; G may be selected from Al, Cr, Mn, Fe, Mg, La, Ce, Sr, V, and a combination thereof; Q may be selected from Ti, Mo, Mn, and a combination thereof; Z may be selected from Cr, V, Fe, Sc, Y, and a combination thereof; and J may be selected from V, Cr, Mn, Co, Ni, Cu, and a combination thereof.

In an implementation, the compounds may have a coating layer on the surface, or may be mixed with another compound having a coating layer. The coating layer may include a coating element compound, e.g., an oxide of a coating element, a hydroxide of a coating element, an oxyhydroxide of a coating element, an oxycarbonate of a coating element, or a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive electrode active material by using these elements in the compound, e.g., spray coating, dipping, or the like.

In the positive electrode, a content of the positive active material may be about 90 wt % to about 98 wt %, based on the total weight of the positive active material layer.

In an implementation, the positive active material layer may further include a binder and a conductive material. In an implementation, the binder and the conductive material may be included in an amount of about 1 wt % to about 5 wt %, respectively, based on the total amount of the positive active material layer.

The binder may help improve binding properties of positive electrode active material particles with one another and with a current collector. Examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene butadiene rubber, acrylated styrene butadiene rubber, an epoxy resin, nylon, and the like.

The conductive material may be included to provide electrode conductivity, and any electrically conductive material may be used as a conductive material unless it causes a chemical change. Examples of the conductive material include a carbon material such as natural graphite, artificial graphite, carbon black, acetylene black, ketjen black, a carbon fiber, and the like; a metal material of a metal powder or a metal fiber including copper, nickel, aluminum, silver, and the like; a conductive polymer such as a polyphenylene derivative; or a mixture thereof.

The current collector may include aluminum foil, nickel foil, or a combination thereof.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate, ester, ether, ketone, alcohol, or aprotic solvent.

The carbonate solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester solvent may include methyl acetate, ethyl acetate, n-propyl acetate, dimethyl acetate, methyl propionate, ethyl propionate, propyl propionate decanolide, mevalonolactone, caprolactone, or the like. The ether solvent may include dibutyl ether, tetraglyme, diglyme, dimethoxyethane, 2-methyltetrahydrofuran, tetrahydrofuran, or the like. The ketone solvent may include cyclohexanone or the like. The alcohol solvent may include ethyl alcohol, isopropyl alcohol, or the like. The aprotic solvent may include nitriles such as R-CN (where R is a C2 to C20 linear, branched, or cyclic hydrocarbon, and may include a double bond, an aromatic ring, or an ether bond), amides such as dimethylformamide, dioxolanes such as 1,3-dioxolane, sulfolanes, or the like.

The organic solvent may be used alone or in a mixture. When the organic solvent is used in a mixture, a mixture ratio may be controlled in accordance with a desirable battery performance.

In an implementation, the carbonate solvent may desirably a mixture with a cyclic carbonate and a linear carbonate. The cyclic carbonate and linear carbonate may be mixed together in a volume ratio of about 1:1 to about 1:9, and when the mixture is used as an electrolyte, it may have enhanced performance.

In an implementation, the organic solvent may further include an aromatic hydrocarbon solvent as well as the carbonate solvent. The carbonate solvent and aromatic hydrocarbon solvent may be mixed together in a volume ratio of about 1:1 to about 30:1.

The aromatic hydrocarbon organic solvent may be an aromatic hydrocarbon compound represented by Chemical Formula 1.

[Chemical Formula 1]

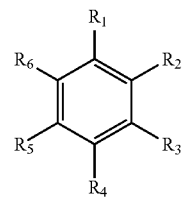

In Chemical Formula 1, $R_1$ to $R_6$ may each independently be or include hydrogen, a halogen, a C1 to C10 alkyl group, a haloalkyl group, or a combination thereof.

Examples of the aromatic hydrocarbon organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In an implementation, the electrolyte may further include vinylethyl carbonate, vinylene carbonate, or an ethylene carbonate compound represented by Chemical Formula 2, as an additive for improving cycle life.

[Chemical Formula 2]

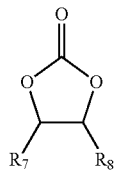

In Chemical Formula 2, $R_7$ and $R_8$ may each independently be hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group, and $R_7$ and $R_8$ are not simultaneously hydrogen.

Examples of the ethylene carbonate compound may include difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. An amount of the additive for improving the cycle-life characteristics may be used within an appropriate range.

The lithium salt dissolved in an organic solvent may supply a battery with lithium ions, basically operates the rechargeable lithium battery, and may help improve transportation of the lithium ions between a positive electrode and a negative electrode. Examples of the lithium salt may include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiF(SO_2)_2N$ (lithium bis (fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein x and y are natural numbers, e.g., an integer of 1 to 20, lithium difluoro(bisoxolato) phosphate), LiCl, LiI, LiB $(C_2O_4)_2$ (lithium bis(oxalato) borate: LiBOB) and lithium difluoro(oxalato)borate (LiDFOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

A separator may be between the positive electrode and the negative electrode depending on a type of a rechargeable lithium battery. The separator may include polyethylene, polypropylene, polyvinylidene fluoride, or multi-layers thereof having two or more layers, and may be a mixed multilayer such as a polyethylene/polypropylene double-layered separator, or a polyethylene/polypropylene/polyethylene triple-layered separator.

Figure 3:
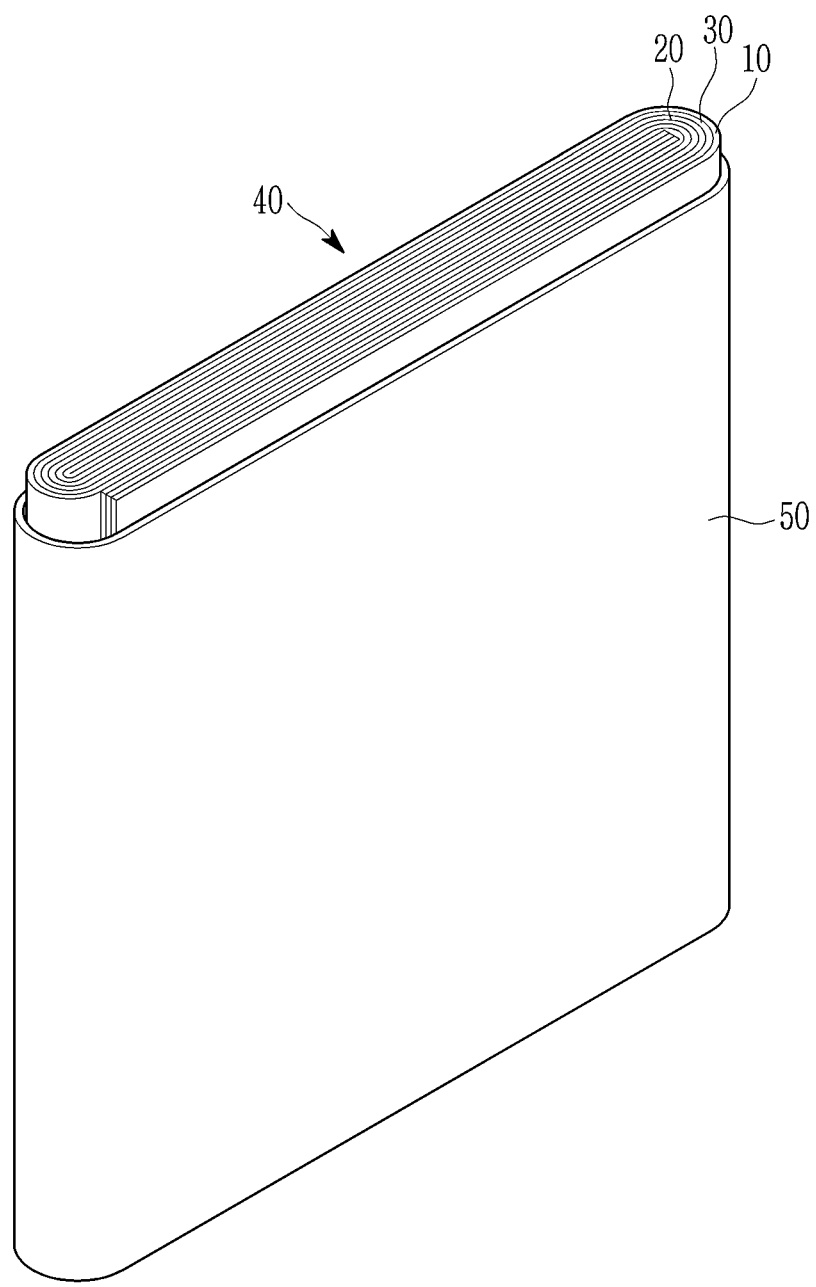
FIG. 3 is a schematic view showing the structure of a rechargeable lithium battery.

FIG. 3 is an exploded perspective view of a rechargeable lithium battery according to an embodiment. As illustrated in FIG. 3, the rechargeable lithium battery may be a prismatic battery, or may include variously-shaped batteries such as a cylindrical battery, a pouch battery, or the like.

Referring to FIG. 3, a rechargeable lithium battery 100 according to an embodiment may include an electrode assembly 40 manufactured by winding a separator 30 between a positive electrode 10 and a negative electrode 20 and a case 50 housing the electrode assembly 40. An electrolyte may be impregnated in the positive electrode 10, the negative electrode 20, and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

A mixed negative active material of a rod-shaped artificial graphite having a long diameter (length) of 60 µm and a maximum aspect ratio of 10 as a first active material and a silicon-carbon composite as a second active material (a weight ratio of the first active material:second active material=1:100), styrene butadiene rubber as a binder, and carboxymethyl cellulose as an agent for increasing viscosity, were mixed in a water solvent at a weight ratio of 96:3:1 to prepare a negative active material slurry. Herein, as the silicon-carbon composite, a silicon-carbon composite including an agglomerated product in which artificial graphite and silicon particles were agglomerated and a soft carbon coating layer coated on the agglomerated product was used. The soft carbon coating layer had a thickness of 20 nm and the silicon particles had an average particle diameter D50 of 135 nm.

The negative active material slurry was coated on a Cu foil current collector, dried, and compressed by the general procedure to prepare negative electrodes including the current collector and a negative active material layer on the current collector, having active mass density of 1.0 g/cc, 1.3 g/cc, 1.5 g/cc, 1.7 g/cc, or 1.9 g/cc, respectively.

Using the negative electrode, a lithium metal counter electrode, and an electrolyte, a rechargeable lithium cell was fabricated.

Furthermore, using the negative electrode, a positive electrode, and an electrolyte, a coin-type rechargeable lithium full cell was fabricated. The positive electrode was used by prepared by mixing a $LiNi_{0.8}Co_{0.1}Al_{0.1}O_2$ positive active material at 96 wt %, a ketjen black conductive material at 2 wt % and a polyvinylidene fluoride at 2 wt % in an N-methyl pyrrolidone solvent to prepare a positive active material slurry, coating the slurry on an Al current collector, drying it, and compressing it.

In the half-cell and the rechargeable lithium cell, the electrolyte was a 1.5 M $LiPF_6$ solution in a mixed solvent of ethylene carbonate, ethylmethyl carbonate, and dimethyl carbonate (20:10:70 by volume ratio).

Example 2

A negative electrode with an active mass density of 1.5 g/cc, a half-cell, and a rechargeable lithium cell were prepared by the same procedure as in Example 1, except that a rod-shaped artificial graphite having a long diameter (length) of 70 µm and a maximum aspect ratio of 10 was used as a first active material.

Example 3

A negative electrode with an active mass density of 1.5 g/cc, a half-cell, and a rechargeable lithium cell were prepared by the same procedure as in Example 1, except that a rod-shaped artificial graphite having a long diameter (length) of 80 µm and a maximum aspect ratio of 10 was used as a first active material.

Example 4

A negative electrode with an active mass density of 1.5 g/cc, a half-cell, and a rechargeable lithium cell were prepared by the same procedure as in Example 1, except that a rod-shaped artificial graphite having a long diameter (length) of 60 µm and a maximum aspect ratio of 4 was used as a first active material.

Example 5

A negative electrode with an active mass density of 1.5 g/cc, a half-cell, and a rechargeable lithium cell were prepared by the same procedure as in Example 1, except that a rod-shaped artificial graphite having a long diameter (length) of 60 µm and a maximum aspect ratio of 15 was used as a first active material.

Example 6

A negative electrode with an active mass density of 1.5 g/cc, a half-cell, and a rechargeable lithium cell were prepared by the same procedure as in Example 1, except that a rod-shaped artificial graphite having a long diameter (length) of 60 μm and a maximum aspect ratio of 20 was used as a first active material.

Example 7

A negative electrode with an active mass density of 1.5 g/cc, a half-cell, and a rechargeable lithium cell were prepared by the same procedure as in Example 1, except that a mixing ratio of the first active material and the second active material was changed to 0.5:100.

Comparative Example 1

Negative electrodes with an active mass density of 1.0 g/cc, 1.3 g/cc, 1.5 g/cc, 1.7 g/cc, or 1.9 g/cc, respectively, a half-cell, and a rechargeable lithium cell were prepared by the same procedure as in Example 1, except that only the silicon-carbon composite was used as the negative active material (e.g., the rod-shaped artificial graphite was omitted).

Comparative Example 2

A negative electrode with an active mass density of 1.5 g/cc and a coin-type half-cell were prepared by the same procedure as in Example 1, except that particle-type artificial graphite having an average particle diameter D50 of 50 was used as the first active material.

Comparative Example 3

A negative electrode with an active mass density of 1.5 g/cc, a half-cell, and a rechargeable lithium cell were prepared by the same procedure as in Example 1, except that carbon nanotubes having a long diameter (length) of 60 μm and a maximum aspect ratio of 10 were used as a first active material.

Comparative Example 4

A negative electrode with an active mass density of 1.5 g/cc and a coin-type half-cell were prepared by the same procedure as in Example 1, except that carbon nanofiber having a long diameter (length) of 60 μm and a maximum aspect ratio of 10 was used as a first active material.

Comparative Example 5

A negative electrode with an active mass density of 1.5 g/cc and a coin-type half-cell were prepared by the same procedure as in Example 1, except that $SiO_x$ (x=1.1) was used as a second active material.

Reference Example 1

A negative electrode with an active mass density of 1.5 g/cc and a coin-type half-cell were prepared by the same procedure as in Example 1, except that a rod-shaped artificial graphite having a long diameter (length) of 59 μm and a maximum aspect ratio of 10 was used as a first active material.

Reference Example 2

A negative electrode with an active mass density of 1.5 g/cc and a coin-type half-cell were prepared by the same procedure as in Example 1, except that a rod-shaped artificial graphite having a long diameter (length) of 81 μm and a maximum aspect ratio of 10 was used as a first active material.

Reference Example 3

A negative electrode with an active mass density of 1.5 g/cc and a coin-type half-cell were prepared by the same procedure as in Example 1, except that a rod-shaped artificial graphite having a long diameter (length) of 60 μm and a maximum aspect ratio of 3 was used as a first active material.

Reference Example 4

A negative electrode with an active mass density of 1.5 g/cc and a coin-type half-cell were prepared by the same procedure as in Example 1, except that a rod-shaped artificial graphite having a long diameter (length) of 60 μm and a maximum aspect ratio of 21 was used as a first active material.

Experimental Example 1) SEM Image

A SEM image of the surface of the negative active material layer of the negative electrode prepared in Example 1 was taken. The SEM image is shown in FIG. 4.

Figure 4:
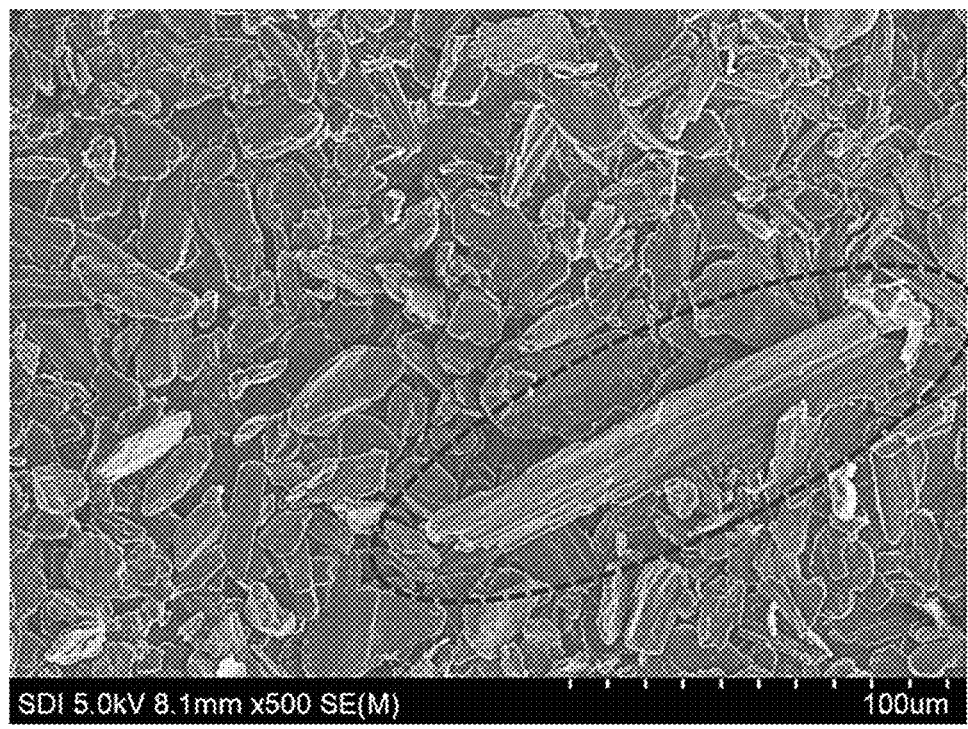
FIG. 4 is a surface SEM image of the negative active material layer of the negative electrode according to Example 1.

As shown in FIG. 4, the negative active material layer of Example 1 included the rod-shaped artificial graphite having a long length.

Experimental Example 2) Electrical Conductivity and Resistance Measurement

The conductivity of the cells according to Example 1 and Comparative Example 1 was measured by a DC resistance measurement method. The DC resistance was measured by the following procedure. The cell was charged at SOC (State of Charge) 50(charge to be 50% of charge capacity based on 100% of the entire battery charge capacity when the cell was charged and discharged between 2.75 V to 4.4 V), applying a 3 C current for 10 seconds, and applying a 0.2 C current. Herein, the DC resistance was obtained by Equation 1 from the difference in current and the difference in voltage. The result is shown in FIG. 5.

$$DC\text{-}IR = dV(V_{3.0C} - V_{0.2C})/dI(I_{3.0C} - I_{0.2C})$$ [Equation 1]

Figure 5:
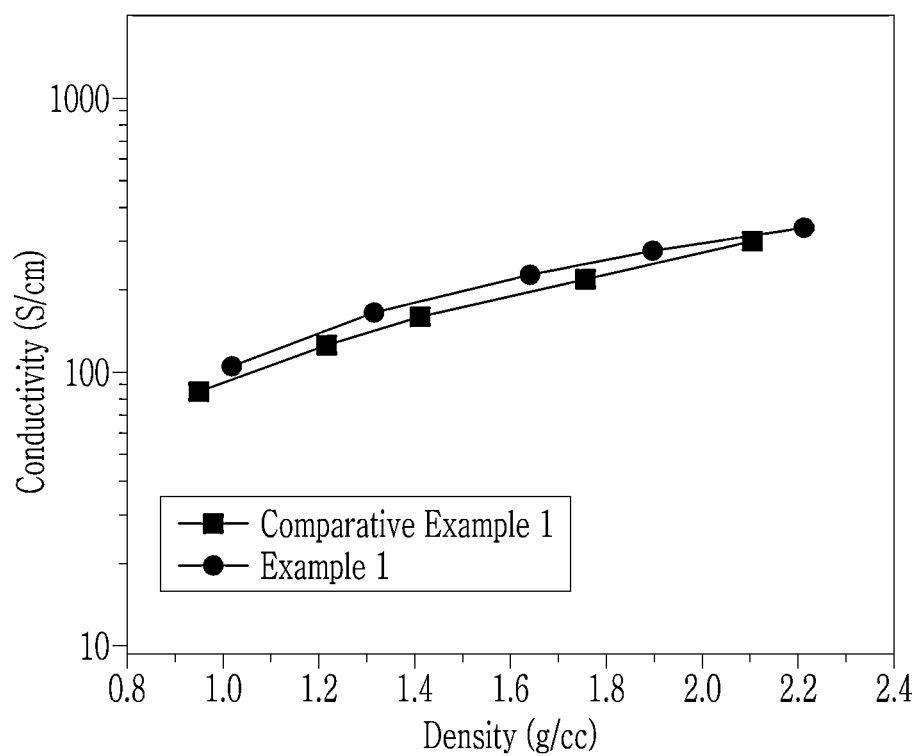
FIG. 5 is a graph showing the electrical conductivity of the negative electrodes according to Example 1 and Comparative Example 1.

As shown in FIG. 5, the conductivity of the negative electrode of Example 1 using the rod-shaped artificial graphite was higher than Comparative Example 1 (in which the rod-shaped artificial graphite was omitted) at all active mass densities.

In the following experiments, as the half-cell of Example 1, the half-cell having an active mass density of 1.5 g/cc was used.

The rechargeable lithium cells according to Examples 1 to 6 and Comparative Examples 1 to 5 were constant-discharged at 10 A for 10 seconds under the SOC 100(state of charge, fully charged state, charge to be 100% of charge capacity based on 100% of entire battery charge capacity) at 60° C., constant-discharged at 1 A for 10 seconds, and constant-discharged at 10 A for 4 seconds. A voltage value and a current value were measured right before storage. Furthermore, the cell was stored at 60° C. for 30 days, and then a voltage value and a current value were measured. The DC resistance (DC-IR) was calculated from the data at 18 seconds and 23 seconds by the equation ΔR=ΔV/ΔI. That is, it was obtained from (voltage measured after 10 A discharge for 10 seconds, 1 A discharge for 10 seconds, and 10 A discharge for 4 seconds—voltage measured after 10 A discharge for 10 seconds and 1 A discharge for 8 seconds)/ current after 10 A discharge for 10 seconds and 8 seconds.

The DCIR resistance increase rate was calculated from the DC resistance just before storage and the DC resistance after 30 days by Equation 2.

DCIR increase rate=[DCIR 30$d$.−DCIR(0$d$.)]/DCIR (0$d$.)×100%  [Equation 2]

In Equation 2, DCIR 30d. indicates DCIR after 30 days, and DCIR (0d.) indicates DCIR just before storage.

The results are shown in Table 1.

Experimental Example 3) Thickness Variation Ratio Measurement

Figure 6:
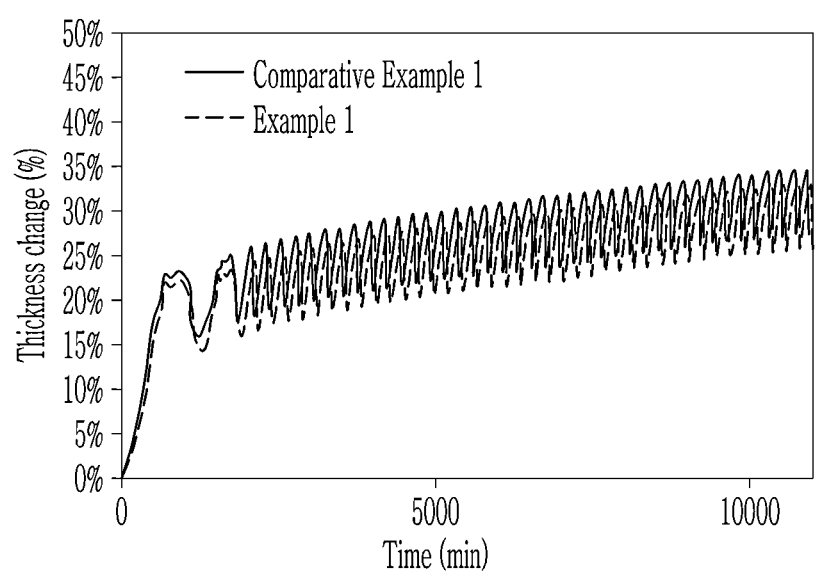
FIG. 6 is a graph showing the thickness variation ratio of the rechargeable lithium cells according to Example 1 and Comparative Example 1.

The rechargeable lithium cells according to Examples 1 to 6 and Comparative Examples 1 to 5 were charged and discharged at 0.5 C under 45° C. for 10,000 minutes (total 43 cycles). Thickness of the cells prior to charging and discharging and thickness after charging and discharging for 10,000 minutes were measured, and a thickness variation ratio was obtained from the measured thicknesses. The results are shown in Table 1. Among these results, the results according to Example 1 and Comparative Example 1 according to each of the charging and discharging cycles are shown in FIG. 6.

Experimental Example 4) Cycle-Life Characteristic Measurement

Rechargeable lithium cells according to Examples 1 to 6 and Comparative Examples 1 to 5 were charged and discharged at 0.5 C for 300 cycles. The capacity ratios of discharge capacity at each of the cycles to first discharge capacity were calculated. Among these results, the ratios of the 300$^{th}$ discharge capacity to the fist discharge capacity are shown in Table 1 as capacity retention.

Figure 7:
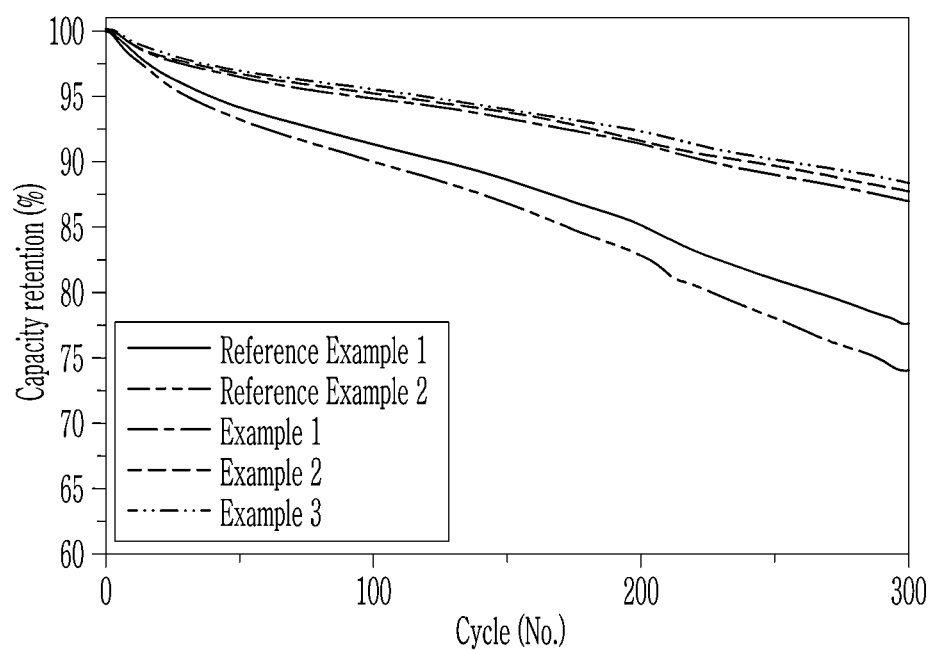
FIG. 7 is a graph showing capacity retention of the rechargeable lithium cells according to Reference Examples 1 and 2 and Examples 1 to 3.

Furthermore, rechargeable lithium cells according to Reference Examples 1 and 2, and Examples 1, 2, and 3 were charged and discharged at 0.5 C for 300 cycles. The ratios of the discharge capacity at each of the cycles to the fist discharge capacity are shown in FIG. 7 as capacity retention.

Figure 8:
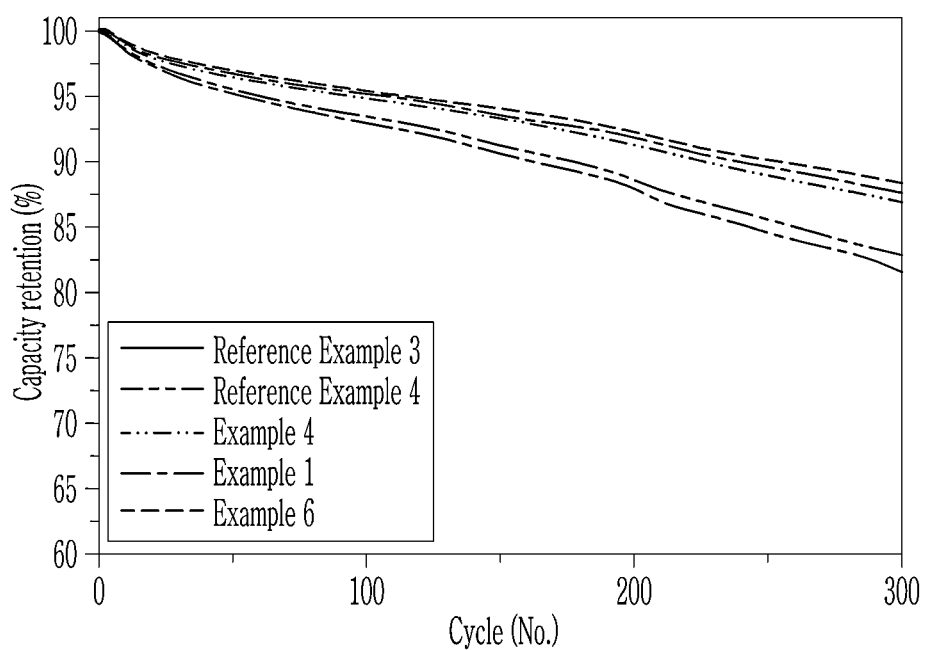
FIG. 8 is a graph showing capacity retention of the rechargeable lithium cells according to Reference Examples 3 and 4 and Examples 4, 1, and 6.

Furthermore, rechargeable lithium cells according to Reference Examples 3 and 4, and Examples 4, 1, and 6 were charged and discharged at 0.5 C for 300 cycles. The ratios of the discharge capacity at each of the cycles to the fist discharge capacity are shown in FIG. 8 as capacity retention.

Experimental Example 5) Rate Capability

The half-cells according to Examples 1 to 6 and Comparative Examples 1 to 5 were charged and discharged at 0.2 C once and at 2 C once. A ratio of charge capacity at 2 C to charge capacity at 0.2 C was calculated. The results are shown in Table 1, as charge rate capability.

TABLE 1

| | DC-IR (ohm) | Thickness variation ratio (%) | Capacity retention (%) | Charge rate capability (0.2 C/ 2.0 C, %) |
| --- | --- | --- | --- | --- |
| Example 1 | 8.2 | 9.3 | 89.2 | 35.3 |
| Example 2 | 7.9 | 9.2 | 88.5 | 34.7 |
| Example 3 | 8.1 | 9.6 | 88.7 | 34.9 |
| Example 4 | 8.3 | 9.1 | 88.0 | 34.1 |
| Example 5 | 8.5 | 9.0 | 88.1 | 34.2 |
| Example 6 | 8.5 | 9.5 | 88.3 | 34.4 |
| Comparative Example 1 | 10.7 | 12.0 | 75.2 | 27.1 |
| Comparative Example 2 | 9.5 | 11.5 | 77.3 | 28.4 |
| Comparative Example 3 | 9.3 | 11.3 | 80.4 | 29.5 |
| Comparative Example 4 | 9.7 | 11.1 | 79.1 | 28.9 |
| Comparative Example 5 | 9.6 | 11.9 | 81.4 | 30.1 |

As shown in Table 1, the thickness variation ratios of the rechargeable lithium cells according to Examples 1 to 6 were lower than Comparative Examples 1 to 5. It may be seen from FIG. 6, the cell of Example 1 exhibited a lower thickness variation ratio than Comparative Example 1, while amplitude of the thickness variation was maintained.

As shown in Table 1, the rechargeable lithium cells of Examples 1 to 6 exhibited better capacity retention than Comparative Examples 1 to 5.

From FIG. 7, it may be seen that capacity retention of the cells according to Reference Example 1 (using the rod-shaped artificial graphite with a long diameter of 59 μm) and Reference Example 2 (using the rod-shaped artificial graphite with a long diameter of 81 μm) were extremely deteriorated compared to the cells according to Examples 1 to 3 using the rod-shaped artificial graphite with long diameters of 60 μm to 80 μm. As shown in FIG. 8, Reference Example 3 (using the rod-shaped crystalline carbon with the aspect ratio of 3) and Reference Example 4 (using the rod-shaped crystalline carbon with the aspect ratio of 21) exhibited extremely deteriorated capacity retention compared to the cells according to Examples 1 to 3 using the rod-shaped artificial graphite with the aspect ratios of 4 to 20.

From Table 1, it may be seen that the half-cells of Examples 1 to 6 exhibited better rate capability, particularly, high rate capability compared to Comparative Examples 1 to 5.

Example 8

A negative electrode with an active mass density of 1.5 g/cc was prepared by the same procedure as in Example 1, except that a mixed negative active material of a rod-shaped artificial graphite having a long diameter (length) of 60 μm and an aspect ratio of 10 was used as a first active material, a silicon-carbon composite as a second active material, and a particle-type natural graphite as a third active material (a weight ratio of the first active material:the second active material:the third active material=1:50:50) was used. Herein, as the silicon-carbon composite, a silicon-carbon composite including an agglomerated product in which artificial graphite and silicon particles were agglomerated and a soft carbon coating layer coated on the agglomerated product was used, the same as Example 1. The soft carbon coating layer had a thickness of 20 nm and the silicon particles had an average particle diameter D50 of 135 nm.

Comparative Example 6

A negative electrode with an active mass density of 1.5 g/cc was prepared by the same procedure as in Example 1, except that a mixed negative active material of the silicon-carbon composite as the first active material and a particle-type natural graphite with an average particle diameter D50 of 15.9 μm as the second active material (weight ratio of the first active material:the second active material=50:50) was used. Herein, as the silicon-carbon composite, a silicon-carbon composite including an agglomerated product in which artificial graphite and silicon particles were agglomerated and a soft carbon coating layer coated on the agglomerated product was used, the same as Example 1. The soft carbon coating layer had a thickness of 20 nm and the silicon particles had an average particle diameter D50 of 135 nm.

Experimental Example 6) Thickness Variation Ratio Measurement

Rechargeable lithium cells of Example 8 and Comparative Example 6 were charged and discharged at 0.5 C under 45° C. for 40 cycles. The thickness of the cells during charge and discharge was measured in real time. The thickness variation ratio of thickness of the cells of each charge and discharge cycle to thickness of the cells after the $1^{st}$ charging and discharging were measured. The results of Example 8 and Comparative Example 6 according to each of charge and discharge cycles are shown in FIG. 9, as expansion ratios.

Figure 9:
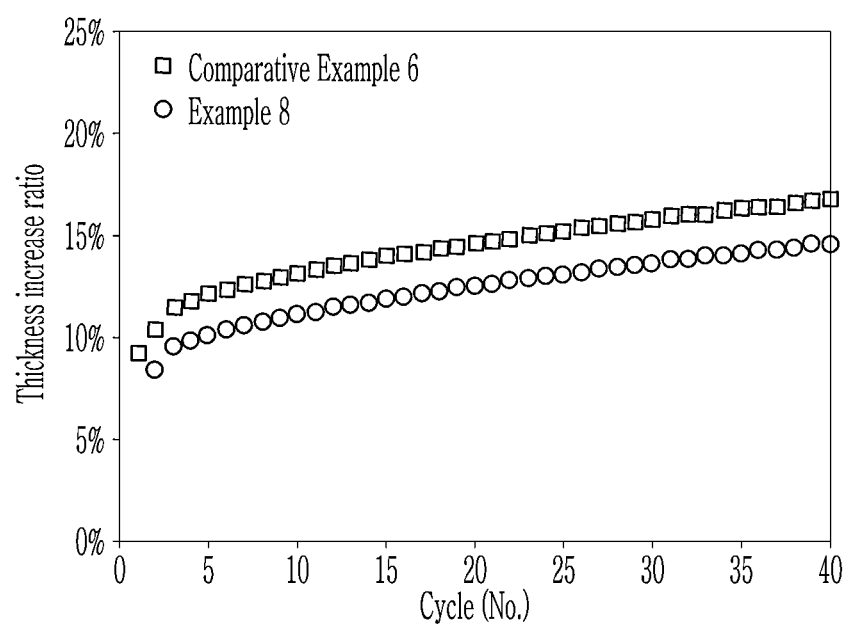
FIG. 9 is a graph showing expansion ratio of the rechargeable lithium cells according to Example 8 and Comparative Example 6.

As shown in FIG. 9, the expansion ratio of Example 8 was lower than Comparative Example 6.

Experimental Example 7) High-Rate Cycle-Life Characteristic Measurement at Room Temperature The rechargeable lithium cells of Example 8 and Comparative Example 6 were charged and under a constant current-constant voltage 1.0 C, 4.2 V, 0.05 C cut-off condition at room temperature (25° C.), paused for 10 minutes, and discharged under a constant current 1.0 C, 2.5 V cut-off condition, and this charge and discharge was performed 100 times.

The capacity ratios of discharge capacity at each of the cycles to first discharge capacity were calculated. The results are shown in FIG. 10, as capacity retention.

Figure 10:
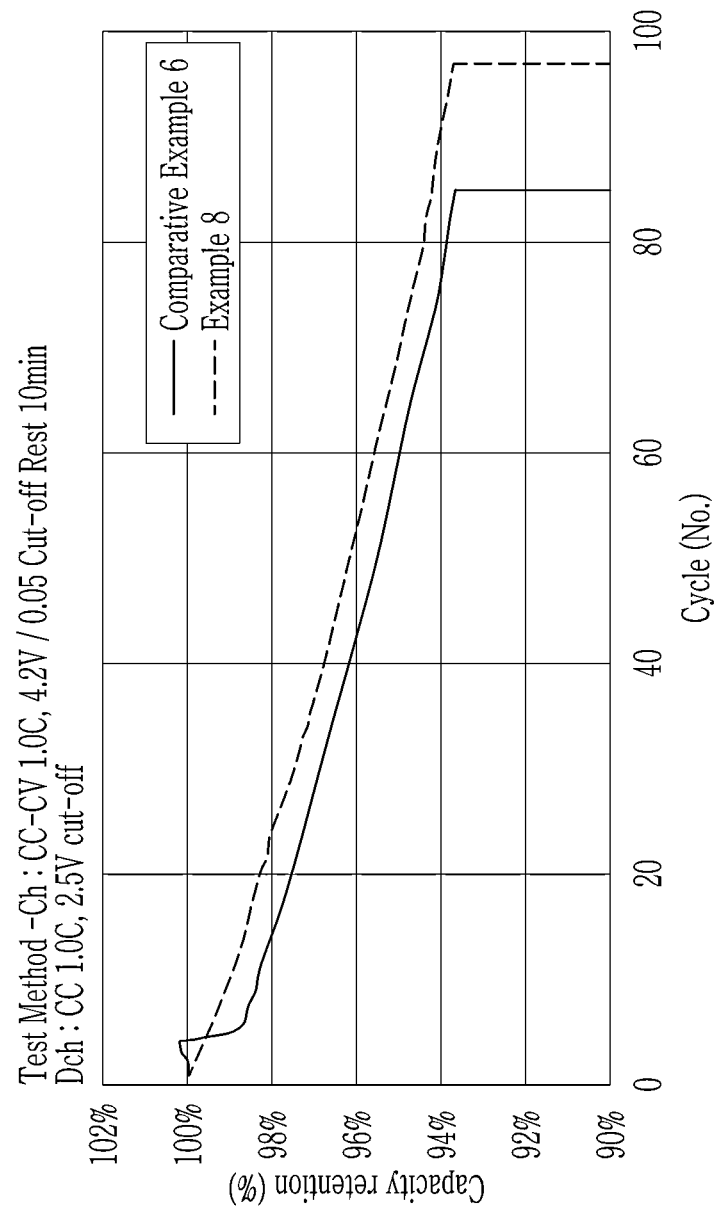
FIG. 10 is a graph showing the high-rate capacity retention at room temperature of the rechargeable lithium cells according to Example 8 and Comparative Example 6.

As shown in FIG. 10, Example 8 exhibited capacity retention of 93%, even though charge and discharged for 97 cycles, and Comparative Example 6 exhibited capacity retention of 93% after 82 charge and discharged cycles. From the results, the high-rate cycle-life characteristic at room temperature of Example 8 was better than Comparative Example 6.

By way of summation and review, as a positive active material of a rechargeable lithium battery, transition metal compounds such as lithium cobalt oxides, lithium nickel oxides, and lithium manganese oxides may be used. The negative active material may use a crystalline carbonaceous material such as natural graphite or artificial graphite, or an amorphous carbon material, but such carbonaceous materials could have low capacity of about 360 mAh/g, and silicon materials such as Si with a capacity of four times or more than the carbonaceous material have been considered.

One or more embodiments may provide a negative active material for a rechargeable lithium battery exhibiting excellent high-rate, electrical conductivity, and cycle-life characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material for a rechargeable lithium battery, the negative active material comprising:
   a rod-shaped crystalline carbon; and
   a silicon-carbon composite,
   wherein the rod-shaped crystalline carbon has a length of about 60 μm to about 80 μm, and
   wherein the silicon-carbon composite includes silicon particles and amorphous carbon.

2. The negative active material for a rechargeable lithium battery as claimed in claim 1, wherein the rod-shaped crystalline carbon has an aspect ratio of about 4 to about 20.

3. The negative active material for a rechargeable lithium battery as claimed in claim 1, wherein the rod-shaped crystalline carbon is artificial graphite.

4. The negative active material for a rechargeable lithium battery as claimed in claim 1, wherein a mixing ratio of the rod-shaped crystalline carbon and the silicon-carbon composite is a weight ratio of about 0.1:100 to about 3:100.

5. The negative active material for a rechargeable lithium battery as claimed in claim 1, wherein the negative active material further includes spherical crystalline carbon.

6. The negative active material for a rechargeable lithium battery as claimed in claim 5, wherein the spherical crystalline carbon is natural graphite, artificial graphite, or a combination thereof.

7. The negative active material for a rechargeable lithium battery as claimed in claim 5, wherein an amount of the spherical crystalline carbon is about 99 parts by weight to about 40 parts by weight, based on 100 parts by weight of the negative active material.

8. The negative active material for a rechargeable lithium battery as claimed in claim 1, wherein the silicon-carbon composite further includes crystalline carbon.

9. A rechargeable lithium battery, comprising:
   a negative electrode including the negative active material as claimed in claim 1;
   a positive electrode; and
   an electrolyte.

10. A negative active material for a rechargeable lithium battery, the negative active material comprising:
    a rod-shaped crystalline carbon; and
    a silicon-carbon composite,
    wherein a mixing ratio of the rod-shaped crystalline carbon and the silicon-carbon composite is a weight ratio of about 0.1:100 to about 3:100.

11. A rechargeable lithium battery, comprising:
    a negative electrode including the negative active material as claimed in claim 10;
    a positive electrode; and
    an electrolyte.

12. A negative active material for a rechargeable lithium battery, the negative active material comprising:
    a rod-shaped crystalline carbon;
    a silicon-carbon composite; and
    spherical crystalline carbon, wherein an amount of the spherical crystalline carbon is about 99 parts by weight to about 40 parts by weight, based on 100 parts by weight of the negative active material.

13. A rechargeable lithium battery, comprising:
a negative electrode including the negative active material as claimed in claim 12;
a positive electrode; and
an electrolyte.

* * * * *